(12) United States Patent
Wang

(10) Patent No.: US 12,502,297 B2
(45) Date of Patent: Dec. 23, 2025

(54) INFLATABLE ANKLE BRACE

(71) Applicant: Chiang-Chuan Wang, Changhua (TW)

(72) Inventor: Chiang-Chuan Wang, Changhua (TW)

( * ) Notice: Subject to any disclaimer, the term of this patent is extended or adjusted under 35 U.S.C. 154(b) by 563 days.

(21) Appl. No.: 17/969,623

(22) Filed: Oct. 19, 2022

(65) Prior Publication Data

US 2024/0130883 A1  Apr. 25, 2024
US 2024/0225878 A9  Jul. 11, 2024

(51) Int. Cl.
*A61F 5/05* (2006.01)
*A61F 5/01* (2006.01)

(52) U.S. Cl.
CPC ............ *A61F 5/012* (2013.01); *A61F 5/0111* (2013.01)

(58) Field of Classification Search
None
See application file for complete search history.

(56) References Cited

U.S. PATENT DOCUMENTS

| | | | | |
|---|---|---|---|---|
| 5,425,701 A * | 6/1995 | Oster | ...................... | A61F 5/012 128/882 |
| 5,496,262 A * | 3/1996 | Johnson, Jr. | ......... | A61H 9/0078 128/DIG. 20 |
| 6,511,449 B2 * | 1/2003 | Burns | ...................... | A61F 5/012 128/DIG. 20 |
| 9,408,612 B2 * | 8/2016 | Haidukewych | ..... | A61F 5/05825 |
| 10,610,397 B2 * | 4/2020 | Batterson | ............ | F16K 11/0853 |
| 2003/0028157 A1 * | 2/2003 | Jusiak | ................... | A61F 5/0111 604/315 |
| 2004/0236258 A1 * | 11/2004 | Burns | ..................... | A61F 5/012 602/13 |

OTHER PUBLICATIONS

DE 2913606 C2: translation (Year: 1988).*

* cited by examiner

*Primary Examiner* — Kim M Lewis
(74) *Attorney, Agent, or Firm* — Che-Yang Chen; Law Office of Michael Chen

(57) ABSTRACT

An inflatable ankle brace may include an ankle brace, an inflating member, and a check valve member, and the check valve member has a check valve and a one-way piece. The ankle brace comprises at least an airbag having a valve port thereon, and the inflating member is adapted to inflate the airbag through the valve port. The inflating member has an air pump and an air tube, and a connector is connected between the air pump and the air tube. The air tube is connected to the valve port, and the connector has an air inlet and an air outlet, and the air inlet connects to the check valve member. The check valve has an elastic tube, and one end of the elastic tube comprises a duckbill first valve which is deformable to open or close, and the other end of the elastic tube is connected to a base.

7 Claims, 8 Drawing Sheets

INFLATABLE ANKLE BRACE

FIELD OF THE INVENTION

The present invention relates to an inflatable ankle brace and more particularly to an inflatable ankle brace with check valve set.

BACKGROUND OF THE INVENTION

Inflatable ankle braces are commonly worn on the ankle to prevent sports injuries or to support the muscles, ligaments and other soft tissues around the joint and to give the ankle a moderate rest when an injury occurs. The conventional inflatable ankle brace comprises at least an air bag, and a valve port of the air bag is connected to an inflating member, and the repeated pressing of the inflating member can make the air bag gradually expand to achieve the effect of pressurizing and protecting the ankle joint.

However, the conventional ankle brace has following disadvantages: (i) the inflating member does not have backstop function, so that it is evitable that the air will leak out in the inflating process, so as to lead to a slow inflation; and (ii) there is no backstop structure between the inflating member and the air bag, so it will cause the air to be squeezed out when the air bag is pressurized to protect the ankle joint, thereby significantly reducing the locating effect of the ankle brace. Therefore, there remains a need for a new and improved design for an inflatable ankle brace to overcome the problems presented above.

SUMMARY OF THE INVENTION

The present invention provides an inflatable ankle brace comprising an ankle brace, an inflating member, and a check valve member, and the check valve member has a check valve and a one-way piece. The ankle brace comprises at least an airbag having a valve port thereon, and the inflating member is adapted to inflate the airbag through the valve port. The inflating member has an air pump and an air tube, and a connector is connected between the air pump and the air tube. The end of the air tube other than one connected to the connector is connected to the valve port, and the connector has an air inlet and an air outlet, and the air inlet is configured to connect to the check valve member. The check valve has an elastic tube, and one end of the elastic tube comprises a duckbill first valve which is deformable to open or close, and the other end of the elastic tube is connected to a base. A connecting hole is formed on the center of the base to communicate with the elastic tube, and the one-way piece formed in two-stepped shape has a first main body and a second main body, and the diameter of the first main body is larger than that of the second main body. The outer diameter of the second main body is matched with the inner diameter of the connecting hole, such that after the check valve is positioned in the air inlet of the connector, the second main body of the one-way piece is inserted and connected into the connecting hole of the check valve. The one-way piece comprises a through hole on the center of the one-way piece and the through hole sequentially penetrates through the first main body and the second main body, and the diameter of the through hole is smaller than that of the elastic tube, and the one-way piece cooperates with the check valve is adapted to achieve the non-return effect.

Comparing with conventional inflatable ankle brace, the present invention is advantageous because: (i) the inflating member is connected to the check valve member, so that it can avoid the leakage of air during inflating process so as to achieve the effect of fast inflation and efficient use; and (ii) the check valve member has the check valve and the one-way piece to cooperate with each other, so as to avoid the air leakage from airbag when the airbag is pressed by force.

DETAILED DESCRIPTION OF THE INVENTION

Figure 1:
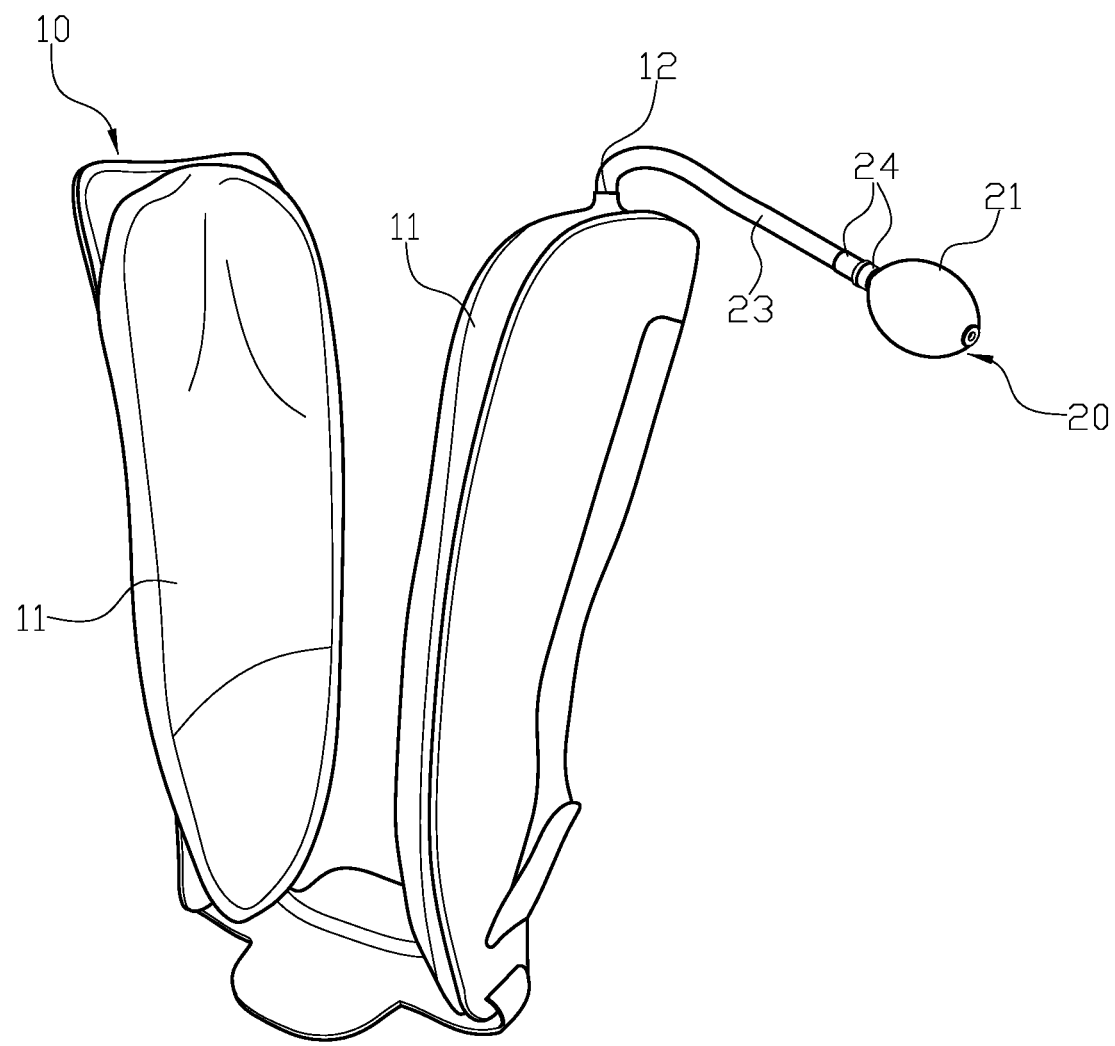
FIG. 1 is a three-dimensional assembly view of an inflatable ankle brace of the present invention.
Figure 2:
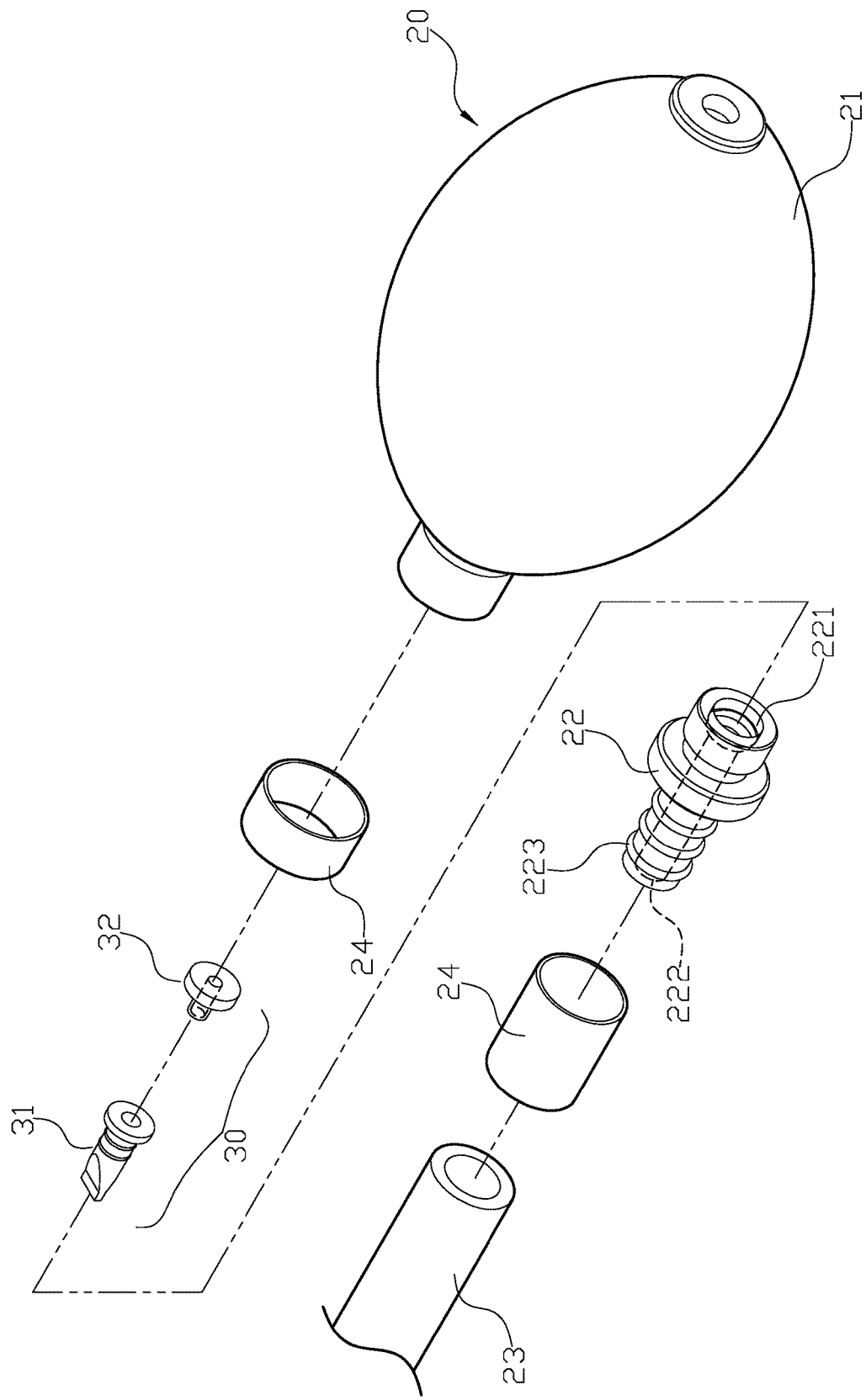
FIG. 2 is a three-dimensional exploded view of the inflatable ankle brace of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides an inflatable ankle brace comprising an ankle brace (10), an inflating member (20), and a check valve member (30), and the check valve member (30) has a check valve (31) and a one-way piece (32). The ankle brace (10) comprises at least an airbag (11) having a valve port (12) thereon, and the inflating member (20) is adapted to inflate the airbag (11)

through the valve port (12). Moreover, the inflating member (20) has an air pump (21) and an air tube (23), and a connector (22) is connected between the air pump (21) and the air tube (23). The end of the air tube (23) other than one connected to the connector (22) is connected to the valve port (12), and the connector (22) has an air inlet (221) and an air outlet (222), and the air inlet (221) is configured to connect to the check valve member (30). The check valve (31) has an elastic tube (311), and one end of the elastic tube (311) comprises a duckbill first valve (312) which is deformable to open or close, and the other end of the elastic tube (312) (311) is connected to a base (313). A connecting hole (314) is formed on the center of the base (313) to communicate with the elastic tube (311), and the one-way piece (32) formed in two-stepped shape has a first main body (321) and a second main body (322), and the diameter of the first main body (321) is larger than that of the second main body (322). The outer diameter of the second main body (322) is matched with the inner diameter of the connecting hole (314), such that after the check valve (31) is positioned in the air inlet (221) of the connector (22), the second main body (322) of the one-way piece (32) is inserted and connected into the connecting hole (314) of the check valve (31). The one-way piece (32) comprises a through hole (323) on the center of the one-way piece (32) and the through hole (323) sequentially penetrates through the first main body (321) and the second main body (322), and the diameter of the through hole (323) is smaller than that of the elastic tube (311), and the one-way piece (32) cooperates with the check valve (31) is adapted to achieve the non-return effect.

In one embodiment, the ankle brace (10) comprises a plurality of airbags (11) which are connected together.

Figure 8:
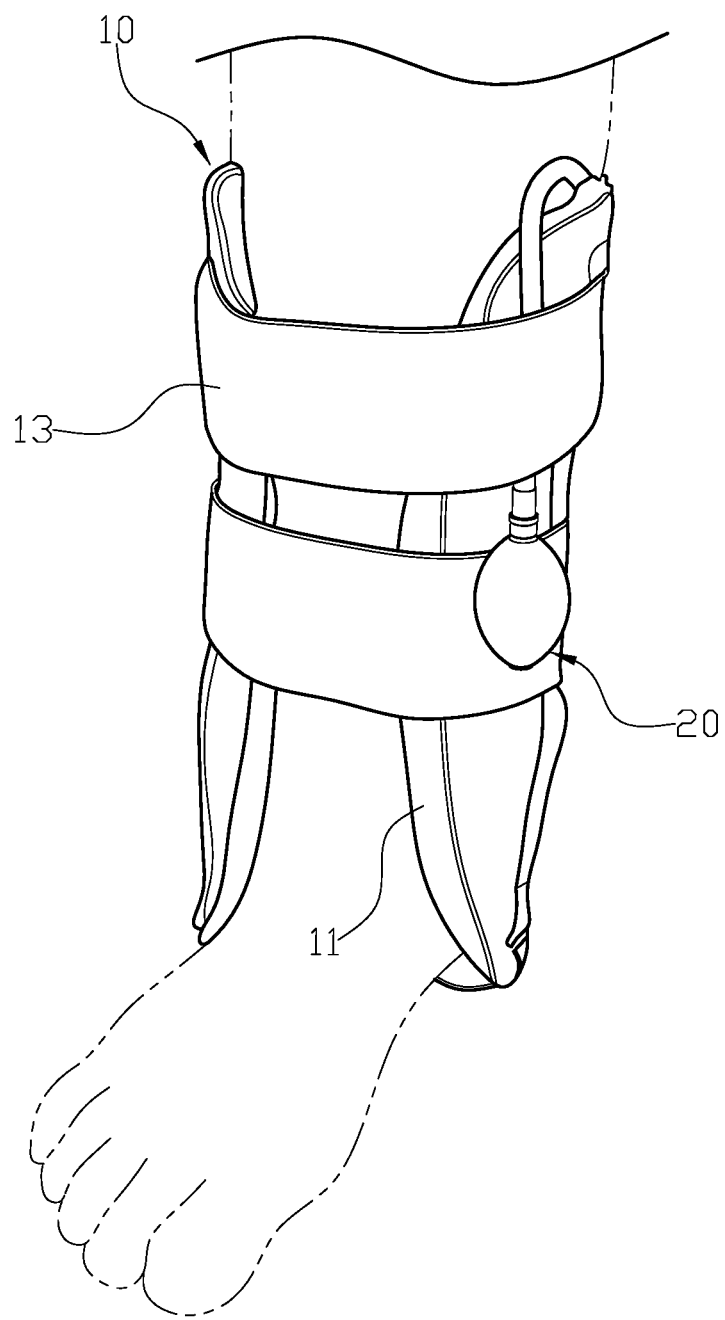
FIG. 8 is a schematic view of the inflatable ankle brace of the present invention when in use.

In another embodiment, the ankle brace (10) has a strap (13) to locate the ankle brace (10) on the ankle after the ankle brace (10) is inflated, and the strap (13) is configured to bind and locate the position of the inflating member (20) (as shown in FIG. 8).

In a further embodiment, the air pump (21) is a flexible ball body and is squishable under pressure.

In still a further embodiment, the connection between the air pump (21), the connector (22), and the air tube (23) are completed by the fastening of locating members (24) which are metal rings.

In an advantageous embodiment, the check valve (31) is made of rubber having a hardness of 80 degrees so as to perform desirable non-return effect.

In another advantageous embodiment, the connector (22) comprises at least a first flange (223) thereon while the elastic tube (311) of the check valve (31) has at least a second flange (315) thereon.

In still another advantageous embodiment, after the check valve member (30) is connected to the connector (22), the first main body (321) is connected and inserted into the air inlet (221).

In a preferred embodiment, the second main body (322) of the one-way piece (32) is coupled and connected to the connecting hole (314) of the check valve (31).

Figure 4:
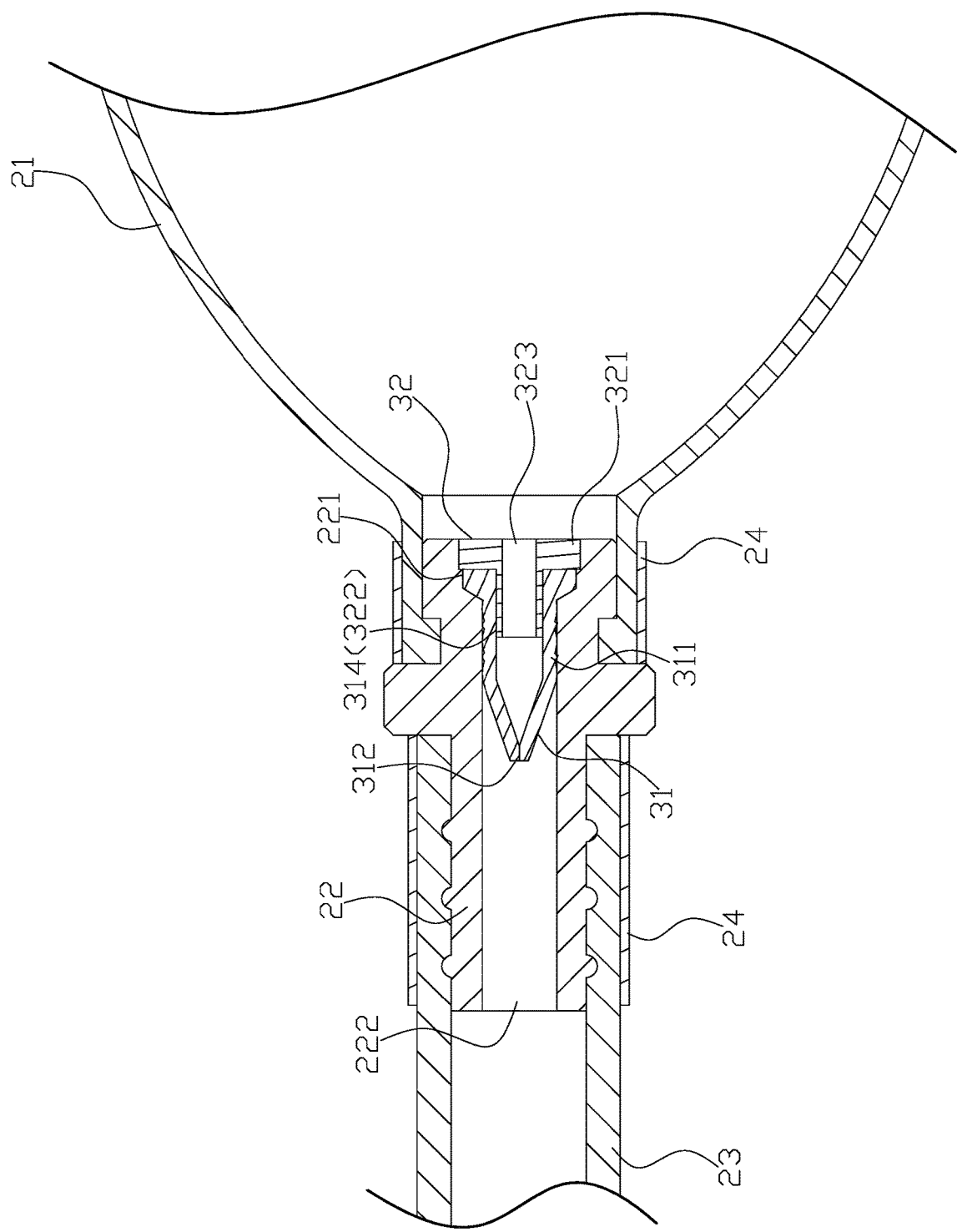
FIG. 4 is a sectional assembly view of the inflatable ankle brace of the present invention.
Figure 7:
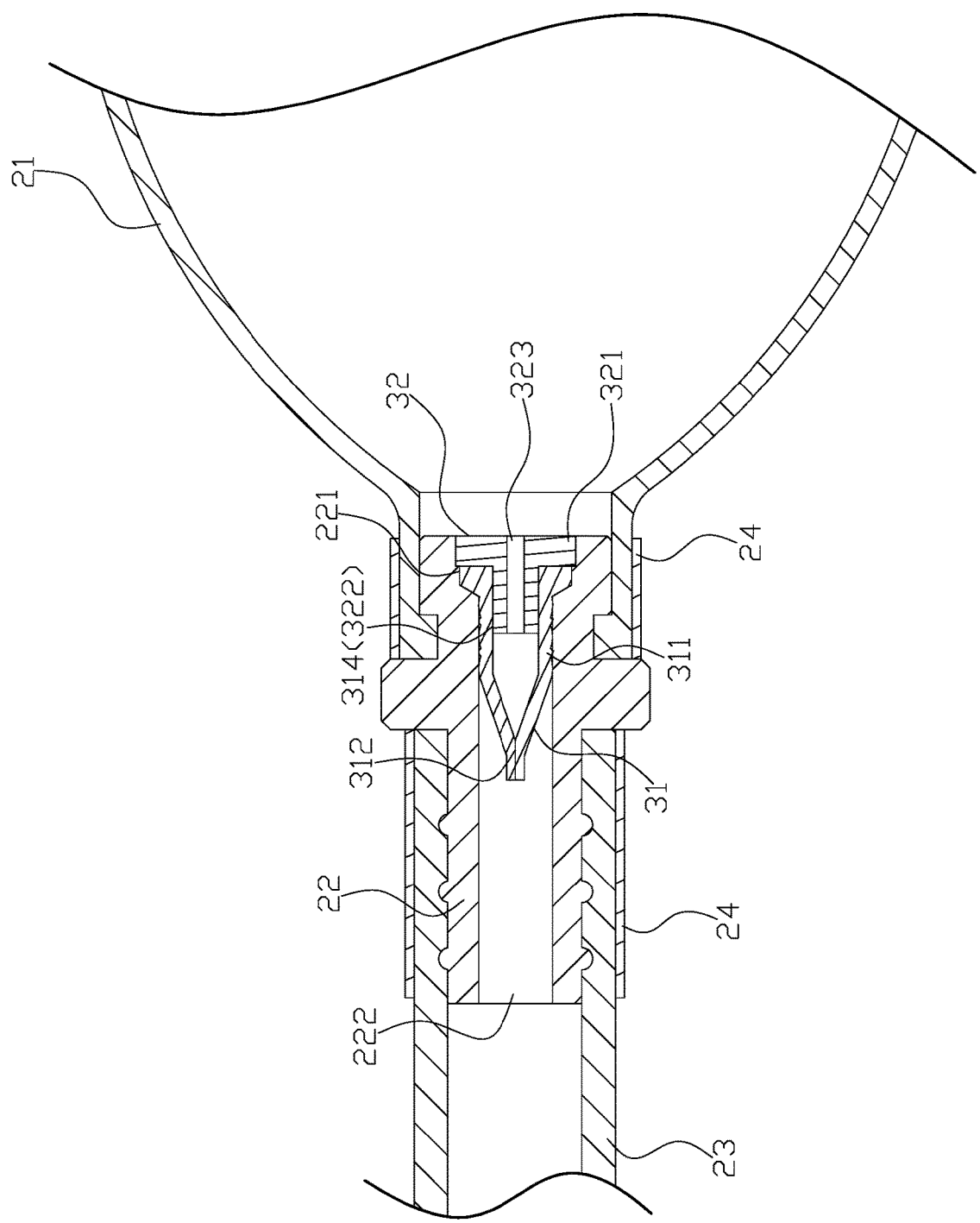
FIG. 7 is a schematic view of different sizes of the through thole of the one-way piece of the inflatable ankle brace in the present invention.

In another preferred embodiment, the first valve (312) of the check valve (31) is formed in an elongated shape so as to enable the check valve (31) to have better non-return effect (as shown in FIGS. 4 and 7).

Figure 3:
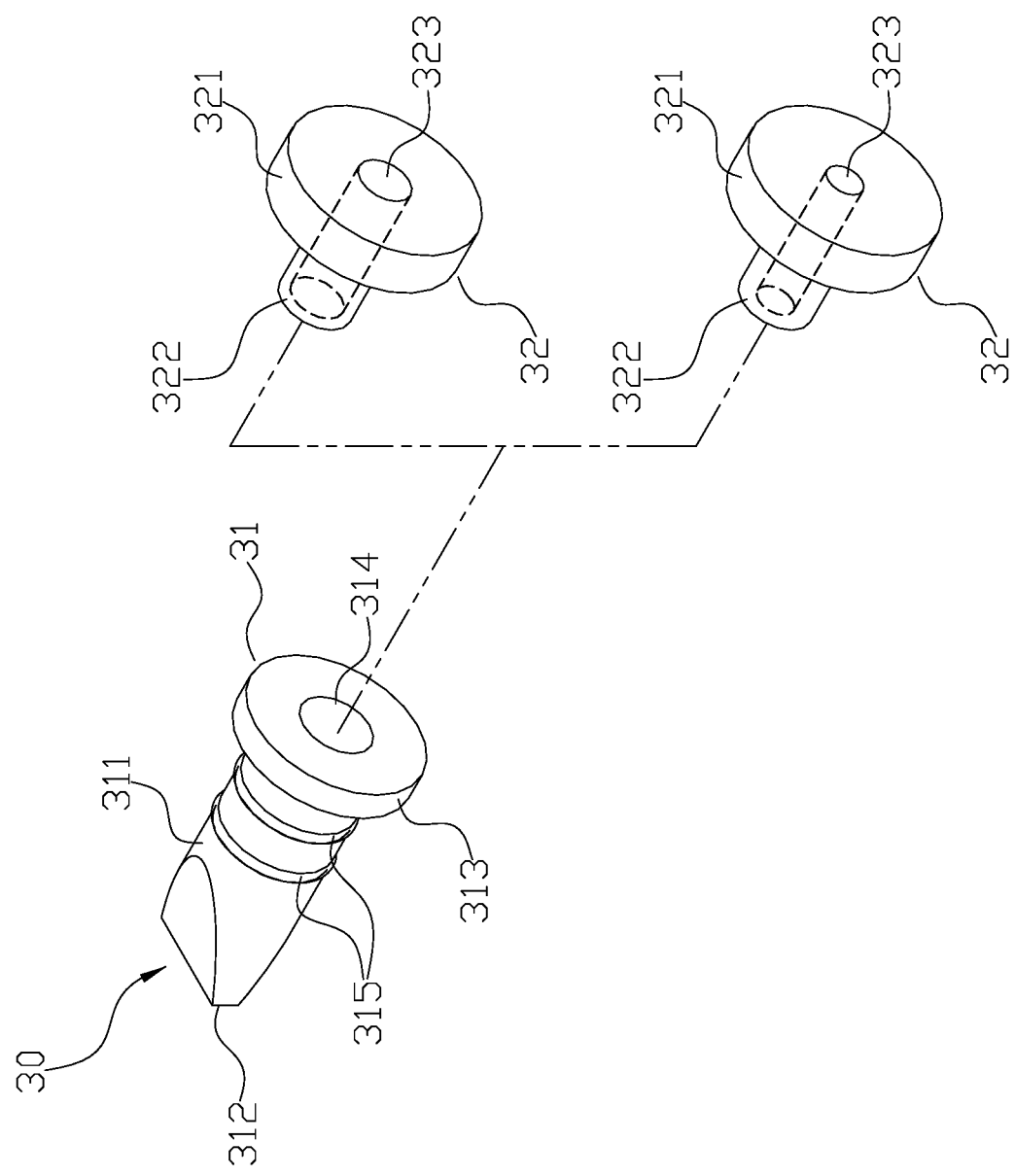
FIG. 3 is a schematic view illustrating the inflatable ankle brace of the present invention is configured to have different sizes of a through hole of a one-way piece.

In still another preferred embodiment, the size of the through hole (323) of the one-way piece (32) is adjustable according to the gas flow rate per unit time (as shown in FIGS. 3, 4 and 7).

Figure 5:
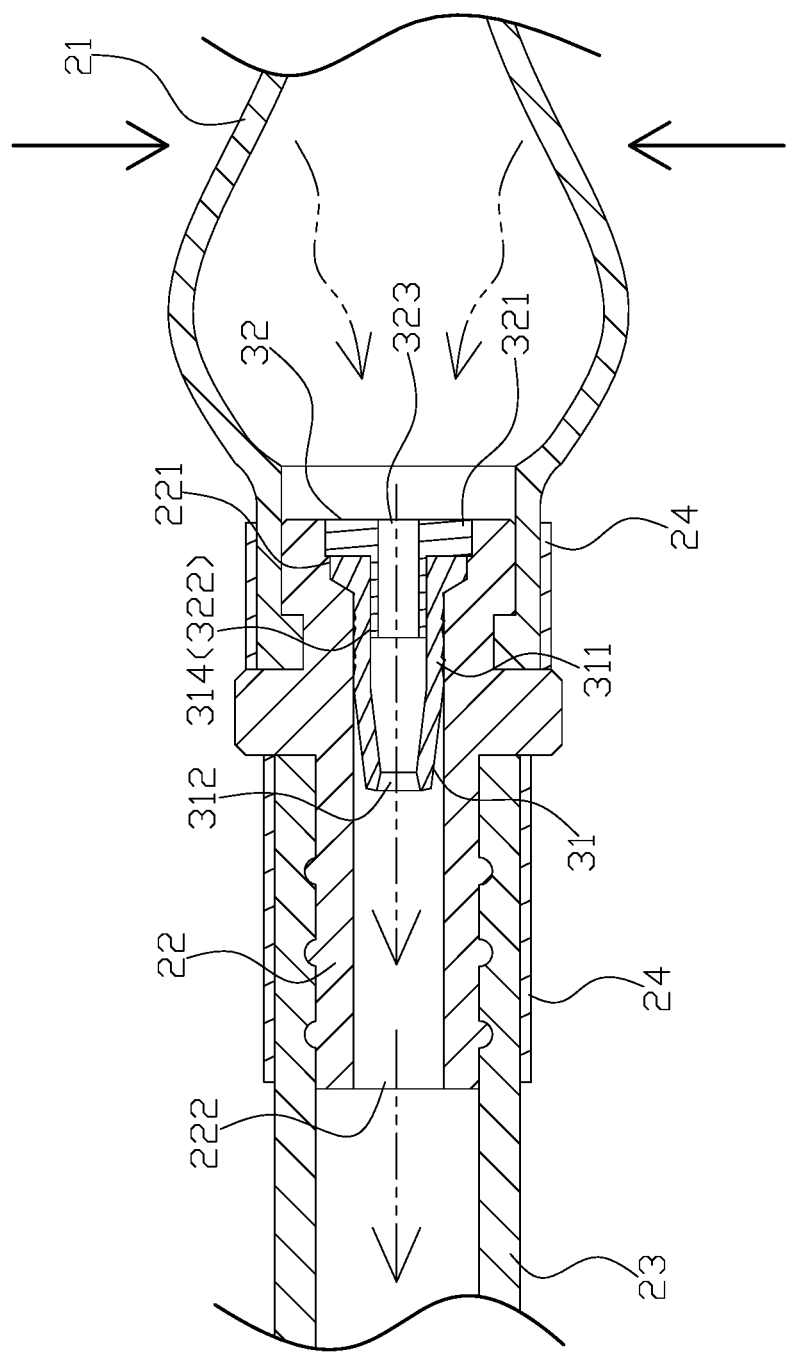
FIG. 5 is a schematic view of the inflatable ankle brace of the present invention when inflated.
Figure 6:
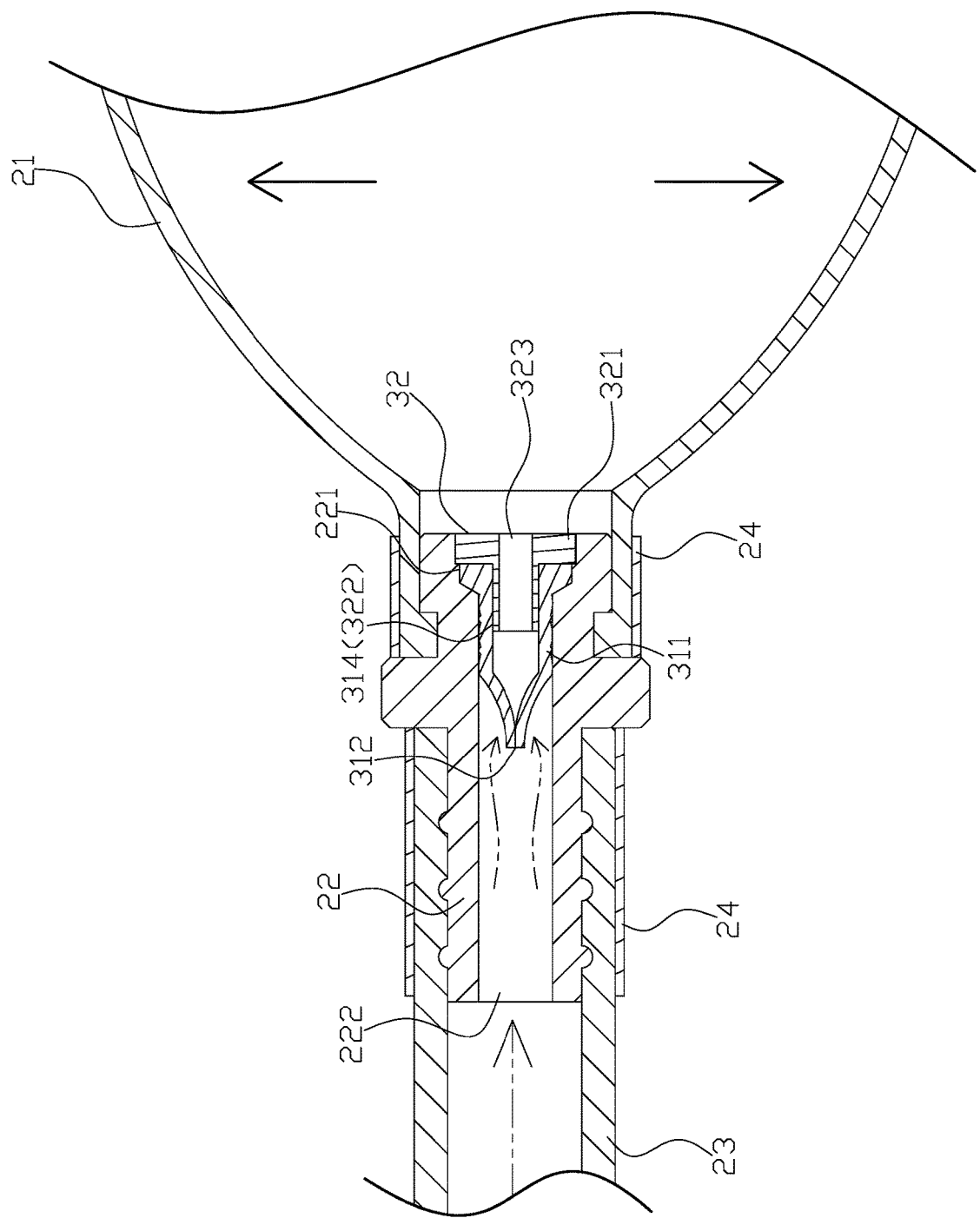
FIG. 6 is a schematic view of the inflatable ankle brace of the present invention performing the non-return effect.

In actual application, the check valve member (30) is coupled and secured in the air inlet (221) of the connector (22). Therefore, when the air is fed from the air pump (21) through the through hole (323), the first valve (312) can be smoothly opened by the forward pressure with the elasticity of the check valve (31) (as shown in FIG. 5), and the air can pass from the first valve (312) through the air outlet (222), the air tube (23), and the valve port (12) into the airbag (11). When the air pump (21) is released, the first valve (312) is adapted to be pressed by the reverse pressure and be immediately elastically closed (as shown in FIG. 6), so as to effectively achieve the non-return effect and to avoid the leakage of air during the inflating process. Moreover, when the reverse pressure is too high (such as in case that the airbag (11) is pressed by force), causing the first valve (312) to be forced to open, the one-way piece (32) connected to the check valve (31) is configured to prevent the high pressure caused by air counterflow that pushes the check valve (31) away from the connector (22). Furthermore, the diameter of the through hole (323) is significantly smaller than the tube diameter of the elastic tube (311), such that higher resistance is generated at the through hole (323) when the air countercurrent, so as to prevent the air from reversely passing through the through hole (323), thereby achieving the non-return effect.

Comparing with conventional inflatable ankle brace, the present invention is advantageous because: (i) the inflating member (20) is connected to the check valve member (30), so that it can avoid the leakage of air during inflating process so as to achieve the effect of fast inflation and efficient use; and (ii) the check valve member (30) has the check valve (31) and the one-way piece (32) to cooperate with each other, so as to avoid the air leakage from airbag (11) when the airbag (11) is pressed by force.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An inflatable ankle brace comprising an ankle brace, an inflating member, and a check valve member, and the check valve member having a check valve and a one-way piece;
   wherein the ankle brace comprises at least an airbag having a valve port thereon, and the inflating member is adapted to inflate the airbag through the valve port;
   wherein the inflating member has an air pump and an air tube, and a connector is connected between the air pump and the air tube; an end of the air tube other than one connected to the connector is connected to the valve port, and the connector has an air inlet and an air outlet, and the air inlet is configured to connect to the check valve member;
   wherein the check valve has an elastic tube, and one end of the elastic tube comprises a duckbill first valve which is deformable to open or close, and an opposite end of the elastic tube is connected to a base; a connecting hole is formed on the center of the base to communicate with the elastic tube; and
   wherein the one-way piece formed in two-stepped shape has a first main body and a second main body, and a diameter of the first main body is larger than that of the second main body; an outer diameter of the second main body is matched with an inner diameter of the connecting hole, such that after the check valve is positioned in the air inlet of the connector, the second main body of the one-way piece is inserted and connected into the connecting hole of the check valve; the one-way piece comprises a through hole on a center of the one-way piece and the through hole sequentially penetrates through the first main body and the second main body, and a diameter of the through hole is smaller than that of the elastic tube, and the one-way piece cooperates with the check valve is adapted to achieve a non-return effect.

2. The inflatable ankle brace of claim 1, wherein the ankle brace comprises a plurality of airbags which are connected together.

3. The inflatable ankle brace of claim 1, wherein the air pump is a flexible ball body and is squishable under pressure.

4. The inflatable ankle brace of claim 1, wherein the connection between the air pump, the connector, and the air tube are completed by fastening of locating members.

5. The inflatable ankle brace of claim 4, wherein the locating members are metal rings.

6. The inflatable ankle brace of claim 1, wherein the check valve is made of rubber having a hardness of 80 degrees.

7. The inflatable ankle brace of claim 1, wherein the second main body of the one-way piece is coupled and connected to the connecting hole of the check valve.

* * * * *